3,159,217
PLASTICALLY DEFORMABLE SOLIDS IN TREATING SUBTERRANEAN FORMATIONS
Alden W. Hanson, Midland, Mich., assignor to The Dow Chemical Company, Midland, Mich., a corporation of Delaware
Filed Apr. 10, 1959, Ser. No. 805,445
16 Claims. (Cl. 166—36)

The invention is related to a method of treating underground formations. It is related more particularly to the use of a plastically deformable composition formed into compact shapes in the treatment of an underground formation traversed by a well.

The treatment of an underground formation includes a number of operations, substantially all of which require, at some stage, the injection of a fluid or a solid material into the formation. Among such treating operations are the injection of fluids at high pressure usually containing a fluid loss preventive and propping agent; chemicals reactive with the formation, e.g., acids, or solvents for minerals as in hydraulic mining; explosives which are subsequently detonated; explosively reactive chemicals which upon contact with each other instantly or after a lapse of time, produce explosions; cementitious materials for consolidating incompetent formations; materials to provide filter packs; particulated resin-coated materials to provide fluid-permeable barriers to the passage of detritus into the well; fluids for fluid-drive recovery operations; solutions for leaching in situ; and circulating fluids to remove geothermal heat.

Wells penetrating fluid-bearing subterranean formations, e.g., oil, gas, water or brine-bearing, usually decline in production rate and quantity after being in production any appreciable length of time. It has been shown that the decline in production of wells is frequently more rapid than the ratio of the quantity of fluids removed therefrom to the fluids yet remaining in the formation would indicate.

Aware, therefore, of the extensiveness of residual fluids in the formation after the flow therefrom by way of the well has noticeably subsided, producers of such fluids have made attempts in a variety of ways to increase the rate and quantity of flow from such wells including the establishment of communication in the earth formations of one well to to another. Among such attempts that have been made is gun-perforation of the formation substantially at right angles to the well, usually accompanied by placement of explosive charges in such perforations which, when detonated, shatter the formation and thereby improve the permeability thereof in the vicinity of such charges. Gauging the intensity of the proper charge to use, guiding its placement in the formation, attempting to predict the portions and fragments of the formation which will be dislodged and the manner and place of the accumulation thereof following the explosive blast are problems associated with the use of such explosives. The inability to successfully solve these problems comprise serious shortcomings to the use of explosives in a number of well-treating situations.

Another attempt to promote fluid flow from wells is by acidizing. Acidizing, briefly, consists of injecting down a well and back into a formation an aqueous acidic solution, usually containing an inhibitor to the corrosion of metal, which chemically attacks exposed surfaces in the formation converting such surfaces and adjacent formation rock, if its composition is such as to be subject to acid attack, into a soluble substance which is thereafter flushed from the well. Acidizing is inherently limited to such rock compositions as limestone and dolomite which are decomposable by acids. Furthermore, the acidizing fluid, initially at least, follows only already existing fractures and channels in the formation.

Another method of promoting fluid flow from wells is hydraulic fracturing. Essentially, hydraulic fracturing consists of injecting down a well and back into the formation through existing passageways therein, a liquid which usually has no chemical action on the formation, illustrative of which are water, oil, or an emulsion, under pressure. The pressure is due to the hydrostatic head aided by the pump pressure used to inject the liquid. When the pressure of the injected liquid within the formation exceeds the rupturing or breaking strength of the formation, fractures are created therein. The direction and extent of progress of the fractures are dependent on a number of factors, prominent among which are the character of the formation and the pattern of passageways existing therein prior to fracturing. It is customary to employ a granular material, insoluble in the fracturing liquid as an additament thereto, at least a portion of which enters newly formed fractures and remains therein, to serve as an agent to prop open the fractures thus produced. Hydraulic fracturing may be expeditiously combined with acidizing and/or blasting techniques where circumstances indicate the feasibility of such combination.

Hydraulic fracturing, however, is not free from disconcerting concomitant effects. One particularly disconcerting effect is the tendency of an hydraulic liquid to pass largely into the more accessible passageways in the formation at the expense of the narrower, more serpentine or tortuous and more remote passageways, the enlargement and extension of which are particularly sought. A second disconcerting effect is the loss of fracturing liquid into a porous formation to the extent that pressure, sufficient to produce satisfactory fractures, i.e., newly opened fissures leading into theretofore noncommunicating portions of the formation, is difficult to attain.

Faced with the aforesaid undesirable effects, attempts have been made to lessen such fluid loss and divert fracturing liquids into the less accessible zones of a formation. Most attempts have been largely directed toward the addition of fluid loss control agents or preventatives to the fracturing liquids. Some of these agents consist of a material or combination of materials which filter out of the fracturing fluid when it comes in contact with porous formation walls ultimately coating the porous walls of the formation so that fracturing pressures can be built up. Other agents act to thicken or increase the viscosity of the fracturing fluid to decrease fluid loss.

Fluid-loss preventatives heretofore employed also have included compositions of two or more particulate materials which, as added, serve as temporary plugging agents, but which after a lapse of time sufficient to serve the purpose of plugging during fracturing, interact to form soluble non-plugging compounds which thereupon dissolve and are washed out of the formation. Examples of materials of this kind are disclosed in U.S. Patent 2,699,213.

Another fluid-loss agent is very finely divided insoluble inorganic material, e.g., silica flour. Another is a lignin compound which is insoluble at the pH of the fracturing liquid when injected into the formation but which undergoes a pH change and becomes soluble subsequent thereto and is washed from the well.

Problems of a similar extent of difficulty are associated with other well-treating operations, for example, for the injection of explosives or heat-generating substances. Such substances have proven to be especially difficult to locate properly and to set off in the well. They frequently are not located in the place desired, explode prematurely, or become duds which resist efforts to set them off and sometimes remain a dangerous hazard.

Known methods of injecting materials, particularly solids, into a well traversing a formation for the purpose of treating the well including fracturing the formation have not completely overcome the problems associated therewith. Known methods of fracturing subterranean formations require substantially large volumes of fracturing fluids in porous formations even when employing fluid-loss preventatives as additives therein. Known fracturing fluids often increase the permeability of the formation to an extent which makes subsequent facturing difficult or ineffective. Furthermore, fluid-loss preventatives now known are generally not acceptable for use in brine and water walls.

A need, therefore, exists for an improved method of treating a well traversing a subterranean formation wherein a substance is to be injected therein including fracturing operations.

Accordingly, the principal object of the instant invention is the provision of an improved well-treating method embodying a method of injecting materials, particularly solids or materials to be kept out of contact with other substances for a time, into a subterranean formation traversed by a well, and of more effectively fracturing such formations.

The invention, therefore, is a method of attaining these and related objects.

In brief, the invention consists of injecting down a pipe, having a constricted outlet, usually provided by a reducer nipple at the lower end thereof and extending either into a hole drilled into a formation to accommodate the pipe or downwardly into a well penetrating a formation, molded shapes or charges of a plastically deformable substance, which is solid during the injection thereof, in a pressure-transmitting fluid. The fluid is either gas or liquid, but is usually liquid. The constricted nipple provides an extrusion effect on the deformable solid charges passing therethrough.

The plastically deformable substance is of a nature which does not prevent flow of fluids from a formation following fracturing. It may, but need not, have a melting point below the temperature of the formation so that it subsequently liquefies. The plastically deformable substance employed in fracturing intermixes with bits of broken rock and is largely rendered fluid-permeable. When fibrous material is used in the preparation of the plastically deformable solid charges, it provides passage of fluid through the deformable substance when in the formation due to the capillarity provided by the fibrous material. If it is desirable to remove the deformable solid from the formation following treatment it can be ignited and burned by introducing an ignition means and oxygen. Often the fluids occurring naturally in the formation have a dissolving or solubilizing effect on the plastically deformable substance, e.g., bitumen, pitch, paraffin and the like in an oil-bearing formation; such effect is an advantage to the outward flow of fluid from the well following treatment according to the invention.

The constricted nipple employed in the invention is usually of a type broadly referred to as a swage nipple. It is generally of a truncated cone or pyramid shape and is affixed to the lower end of the string of tubing, the upper end of the nipple having cross-sectional dimensions substantially those of the tubing and the lower end having its largest dimension less than the smallest dimension of the deformable solid charges employed. The difference in the upper and lower cross-sectional dimensions of the nipple are not highly critical so long as the inside dimensions of the lower end are smaller than those of the deformable solid charges so that the deformable charges will close the constriction as they pass therethrough.

Illustrative of plastically deformable materials suitable for the practice of the invention are paraffin, asphalt, pitch, bitumen, and thermoplastic resins which possess suitable plasticity during injection. The pressure-transmitting fluid may be any liquid substantially unreactive with the deformable solid in contact therewith. Water, oil, emulsions, greases, and waxes which are fluidizable under the conditions employed and gases, e.g., air, are illustrative of pressure-transmitting fluids.

The charges are molded into shapes which are adaptable to being fed down a string of tubing. They may be spherical, obrotund, cubical, or parallelepipedal with rounded corners. They are preferably elongated cylinders. The diameter of the charges in all instances must be less than the inside diameter of the tubing but greater than the diameter of the constricted tubing outlet, e.g., orifice or reducer nipple. The smaller cross-sectional area of the outlet provides a means for extruding the deformable solids as they pass into the well. The larger cross-section of the tubing permits displacement of the pressure-transmitting fluid past the downwardly moving charges as the lowermost charge is extruded through the constricted outlet of the tubing. As each charge passes through the constricted outlet, it closes it.

When the object of the invention is to fracture, the wellbore below the constricted outlet is filled with charges of the more deformable substance and the charges are forced into the more accessible zones of the formation or against porous walls thereof as a mass, the advancing face thereof, upon contact with the walls of the formation, more-or-less assuming the contour of the walls against which the mass is forced. An effective fracturing fluid is thereby provided by the plugs themselves.

Another embodiment is to soften or melt the plastically deformable material prior to molding, intermix therewith a fibrous material, and thereafter mold the intermixture into desired shapes. The fibrous material forms a lattice-like matrix in the forms thus made.

A further embodiment of the invention is to mold a sheath of the plastically deformable, preferably fiber-reinforced, composition about a core of metal, reactive with an acid, having its greater cross-sectional dimension smaller than the smallest dimension of the outlet or throat of the constricted nipple, the cross-section of the entire charge, however, being larger than that of the outlet. For example, a core of magnesium or aluminum metal is ensheathed in a paraffin jacket, preferably fiber-reinforced, and injected via a pressure-transmitting fluid into the well. A portion of an occasional metal core becomes exposed as the ensheathed charges pass through the outlet. Intermittently or subsequently, an acid, e.g., hydrochloric acid, is injected into the well and reacts with the metal surfaces exposed thereby creating sufficient heat to melt the paraffin from the remaining charges. The acid may be employed as the pressure-transmitting liquid, if desired, by permitting a sufficient quantity thereof to pass into the well below the constriction between passage of the charges. However, better control is obtained by employing water or other inert liquid as the pressure-transmitting fluid and pumping the acid in separately. The reaction between the acid and the metal produces high heat in the well. By alternately forcing the charges and the acid into the well, a continuous heat-generating process is set up.

A still further embodiment of the invention is to mold a sheath of the plastically deformable, preferably fiber-reinforced, composition about a soft alkali metal, e.g., sodium, potassium, or mixtures thereof, and inject the thus-ensheathed metal via an unreactive oil pressure-transmitting fluid, e.g., kerosene, into the formation to be treated. The soft metal core serves as a very effective aid to the composition in the prevention of fluid loss. By subsequently contacting the alkali metal with water, either that present in the formation or pumped down the well, both fracturing and high heat are produced by the ensuing violent reaction, hydrogen and an alkali metal hydroxide being formed. By maintaining pressure on the well and introducing oxygen, a second explosion can be provided yielding water. Both the water and the alkali metal hydroxide can thereafter be conveniently removed from the formation by reversing the flow therein as by releasing the pressure at the wellhead.

A still further embodiment of the invention is to employ the plastically deformable, preferably fiber-reinforced, composition as a sheath about one essential reactant of an explosive reaction and thereafter inject a second reactant essential to the explosive reaction into the well or the second reactant may be present or produced in the formation, for example, natural calcium carbonate rock may be retorted in situ to yield CaO by the introduction of high heat. Particulate carbon is encased in the deformable composition or is admixed therewith and brought into contact with the CaO thus produced to yield $CaC_2$ which is subsequently reacted with water in the formation to yield acetylene. Methods of introducing sufficient heat to retort or calcine the carbonate in situ include (1) pumping a hydrocarbon fuel into the formation, or employing such hydrocarbon as fuel if already present in the formation, and igniting the fuel by known means including lowering gas-fired or electric spark generator ignition means into the formation in the proximity of the fuel and (2) lowering nuclear fissionable or fusionable material into the formation and by the ensuing atomic reaction provide heat for calcining the calcium carbonate. The employment of thermonuclear explosions in subterranean formations broadly is well described in Les Applications de l'Explosion Thermonucleaire, by Camille Rougeron 1956, published by Berger-Levrault, Paris, France.

Another embodiment of the invention encompasses introducing two or more reactive substances, each substance encased in or intermixed with a deformable combustible hydrocarbon solid in separate molded charge having the cross-sectional area for injecting through the constricted outlet of a tubing extending into a well similarly as above described, to yield in situ upon combustion of the hydrocarbon, a substance which is reactive either with the formation or with a material introduced into the formation.

Illustrative of the above embodiment of the invention, two types of suitable sized deformable charges are prepared, one consisting of a chlorinated hydrocarbon, e.g., hexachloroethane or hexachlorobenzene either encased in or intermixed with paraffin, and the other of an oxygen gas source, e.g., $NH_4NO_3$ or a chlorate such as $KClO_3$, preferably containing $MnO_2$ as a catalyst.

The charges are injected into a well penetrating a $CaCO_3$-containing formation by means of a pressure-transmitting fluid in accordance with the foregoing description. The paraffin is thereafter ignited, e.g., as above described, and the heat produced by the combustion thereof causes decomposition of the $NH_4NO_3$ or $KClO_3$ to yield $O_2$ which then reacts with the hexachloroethane or hexachlorobenzene to produce HCl. If water is present in the formation, as is commonly the case, hydrochloric acid is formed, or if water is not present, it is injected into the well to produce hydrochloric acid. This embodiment of the invention provides a method of producing a corrosive substance in the formation, thus avoiding the need of preventing corrosion of equipment during a treating operation.

A further illustration of producing a reactive substance in situ in a formation is that of encasing or intermixing a fluoride, e.g., $CaF_2$ in plastically deformable charges and injecting the charges in a pressure transmitting fluid into a well according to the invention and injecting a mineral acid, e.g., $H_2SO_4$, in the well to form HF in situ.

Another still further embodiment of the invention is to mold the plastically deformable, preferably fiber-reinforced, composition of the invention about charges of the explosive substance, e.g., ammonium nitrate, inject the thus-ensheathed explosive charges into a subterranean zone and detonate the explosive charges according to known means.

The plastically deformable reinforced composition of the invention may also be used to provide an improved method of treating wells according to U.S. Patent 2,699,213. In that patent, reactants, at least one of which serves as a plugging agent in the unreacted state, e.g., an alkali metal or alkaline earth hydroxide and an ammonium halide, are introduced into a formation, and subsequent thereto come into contact and react to form soluble products easily removed from the formation. Greater delayed action can be attained by ensheathing in the composition of the instant invention one of the reactants employed, e.g., either the hydroxide as illustrated by $Ca(OH)_2$ or the salt reactive therewith as illustrated by $NH_4Cl$.

A modification of the above embodiment employing the fibrous material consists of merely dipping the fibrous material into the melted solidifiable material, removing it therefrom and forming the fibrous material having deformable plastic composition adhering thereto and entrapped therein, into shapes suitable for use in accordance with the invention. A further modification is to place the fibrous material substantially dry into a tubular form and pour fluid material, which solidifies at room temperature, into the tubular form containing the fibrous material. Any deformable solid which can be sufficiently softened to admix fibrous material therewith and which subsequently becomes sufficiently firm before injection into tubing of a well to retain substantially its shape while passing down the tubing but deforms under pressure to pass through the constricted outlet of the tubing is satisfactory for the practice of this embodiment of the invention.

The reinforcing fibers or strands, when employed in the invention, can be one or more of a number of types of such materials illustrative of which are excelsior, straw, grasses, shredded paper, wood pulp, nutshells, fine metallic wire, grain and seed hulls, asbestos, shredded synthetic resins, e.g., polyvinyl chloride, polyacrylamide, polystyrene, cellulosic material generally, and natural and synthetic fibers, e.g., wool, cotton, hemp, nylon, rayon, and the like.

Since the fibrous material remains in the formation it is preferable that it be absorbent, to some extent at least, of the fluid in the formation. It thereby serves as a sort of wick which encourages fluid flow therethrough by capillary action after fracturing.

The pattern produced by the reinforcing fibers is usually an interlaced random pattern formed by the mixing of such materials. The mixing is best accomplished at a temperature above the softening of the melting point of the plastic and is continued while the plastic is cooled to a point below the softening point. Any suitable type of mixing apparatus, e.g., a paddle, impeller, roller or tumbler type, may be used.

The bulk mixture thus formed is then preferably formed into sticks or rods having a diameter and length above described.

The relative amounts of the plastically deformable substance and the reinforcing fibers, when employed, are not highly critical and are dependent upon the pressures employed, the temperatures encountered, the character of the formation, and the particular plastic and reinforcing materials employed. Sufficient fibers should be employed to lend the desired strength to the composition when molded into shapes of suitable size to accomplish the specific objectives of the treating operation. The fibers also serve as a propping agent to aid in holding open fractures that were created during fracturing.

The deformable solid employed in the invention, e.g., paraffin, has a thick consistency which is retained for at least some time after fracturing and is an effective fracturing composition when used without the aid of the reinforcing fibers.

The propping effect of the deformable composition employed according to the invention, however, is enhanced by the presence of the fibrous material. Furthermore, rubble or broken bits of formation are produced in the fracture during fracturing. In the presence of the deformable solids, and particularly when fiber reinforced, in the practice of the invention, the rubble becomes immeshed in the solids and thereby serves as a propping agent in a manner not attained by employing the usual fracturing compositions. Commonly employed propping agents such as sand are usually, therefore, unnecessary for successful fracturing when employing the composition of the invention. However, if desired, known propping agents, e.g., sand of a 20–60 mesh size, may be intermixed with the deformable solid or encased therein and employed in the practice of the invention.

The viscosity of the pressure-transmitting fluid is not critical so long as it permits fluid flow without appreciable distortion of the deformable charges until they are being forced through the constricted outlet of the tubing.

The solid plastically deformable charges or slugs as used in the invention may have a density which is equal to, greater than, or less than that of the pressure-transmitting fluid. Charges lighter than the fluid will float in it and thereby be pressed against the top of the tubing by the pressure-transmitting fluid. Charges heavier than the fluid will sink in it and rest upon the constricted outlet at the lower end of the tubing. Either lighter or heavier charges will thereby be subjected to a compression force, the magnitude of which depends upon the volume (V) of the column of charges in the tubing and the difference (D) upon the density of the charges and the fluid. The compression force can be calculated by the aid of the following calculations:

The total compression load is $V \times D$. To avoid crushing the charges, they must be able to withstand a crushing load at least as great as $V \times D$. If L is the length of the column of solid charges and the cross-sectional area of a charges is $A_s$, and the predetermined unit compression strength of the charges is $C_s$, then:

$VD = A_s \times C_s$ and $V = L \times A_s$. The charge must therefore, have a compressive strength $C_s$ at least as great as $VD/A_s$ to withstand crushing.

Since $V = L \times A_s$, then $C_s = LD$ or $D = C_s/A_s$.

An example will illustrate the use of the formula.

Let $L = 2,000$ ft. or 24,000 inches
Let $C_s = 500$ p.s.i.
Let $D_s = .0324$ lb./in.$^3$
Then $D = 500/24,000 = .0208$ lb./in.$^3$ This means that the fluid density can be .0208 lb./in.$^3$ more than the density of the solid in which case the compressive load will be at the top, or it can be .0208 lb./in.$^3$ less than the density of the solid in which case the compressive load will be at the bottom.

Therefore, as long as the fluid density is between $(.0324 + .0208)$ lb./in.$^3 = 92$ lb./ft.$^3$ and $(.0324 - .0208)$ lb./in.$^3 = 20$ lb./ft.$^3$ we will not exceed the compressive strength of the solid.

It should be pointed out that the density of the solid may be varied by loading it with either lighter or heavier material and, the compressive strength and density of the thus formed composite material used in the formula. Illustrative of substances used for weighting the charges are such salts and oxides as $BaSO_4$ and $Fe_2O_3$. Illustrative of materials for lessening the density are cellulose and small hollow bodies, i.e., glass beads.

The invention provides an especially effective method of fracturing fluid-bearing formations wherein the plastically deformable shapes or charges in a pressure-transmitting fluid are forced down a pipe suspended in a wellbore, out the constricted nipple at the lower end thereof, and into the formation until fracturing pressures are built up by the plastically deformable solid mass in the formation resulting in the fracture thereof.

In treating a well in accordance with the invention a packer is provided, above the formation to be treated, positioned in the annulus between the casing or wellbore wall and the tubing. A particularly suitable apparatus for use in treating a well according to the invention is described in U.S. Patent 2,481,422 to Haynes et al. However, conventional pumping equipment which provides also for feeding the charges down the tubing is satisfactory. The entire volume of the tubing is filled by the combined volumes of the solid charges and a pressure-transmitting fluid. Part of the fluid, at the start of the treatment, may be oil, brine or water of the formation. The ratio by volume of the solids to the liquid is not important where the solids are of greater density than the fluid. However, where the solids are of less density than the fluid, the solids will of necessity be fed into the tubing until the entire tube length is taken up, the balance of the volume being filled with fluid.

Solid charges of less density than the fluid may be forced through the constricted outlet of the tubing by force of the motion of the pressure-transmitting fluid being injected into the well whereby considerable quantities of the fluid will pass into the well, below the constricted outlet, between each solid charge. Although loss of pressure-transmitting fluid into the well is necessitated by employing light density solids, such fluid in the well may be tolerated and such practice is within the purview of the invention. To lessen the loss of fluid into the well, pressure may be applied at the upper surface of the fluid having the column of light density charges therein, as by a separate phase fluid, e.g., air, when the pressure-transmitting fluid is water or oil, and thereby force the charges through the construction.

After the treatment is in progress, pressure-transmitting fluid and solid charges are introduced into the tubing to replaces the charges and the fluid if any displaced into the well.

A bleed-off line is provided at the top of the tubing preferably equipped with a pressure-actuated valve and a gauge, to provide an outlet for excess pressure-transmitting fluid. Therefore, when employing relatively high density solids, excess pressure-transmitting fluid may be employed since such excess fluid will be displaced out through the bleed-off line. The use of deformable solids having a density greater than that of the fluid is the preferred mode of practicing the invention.

The passage of a solid charge of greater density than the fluid out of the constricted end of the tubing is usually ascertainable by a rise in pressure while the charge is forced out followed by a drop in pressure immediately thereafter.

Figure 1:
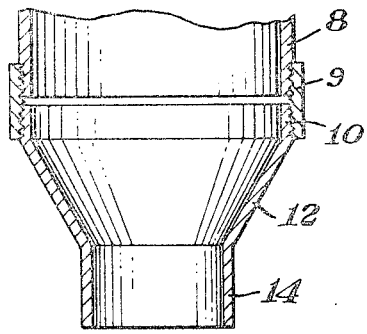
FIGURE 1 is an elevational view, in section, of a constricting nipple.

FIGURE 1 of the drawing is an elevational view, partly in section, of a constricting nipple useful in the practice of the invention wherein 8 is a tubing, 9 is a coupling for securing the nipple to the lower end of the tubing, 10 is the upper cylindrical portion of about the same diameter as the tubing, 12 is the tapered or frusto-conical portion of the nipple, and 14 is the lower cylindrical portion of less diameter than the tubing.

Fracturing is effected by the deformable material being forced under pressure into accessible channels and pores of the formation, rupturing the rock of the formation by the pressure build-up thus provided and thereby creating fissures extending outwardly therefrom. Exceedingly porous strata may be successfully fractured by the practice of the invention because the fracturing medium used, i.e., the deformable solid, is inherently of substantially zero fluid loss.

In a number of well-treating operations, two or more of the embodiments of the invention may be combined. For example, hydraulic fracturing, employing the fluid loss properties of the deformable composition, preferably reinforced, may be combined with the acidizing when acid is alternately or subsequently injected into the well. Hydraulic fracturing may be combined with the acidizing and with heat disintegration when Al or Mg metal, ensheathed in a deformable composition, is injected in a pressure-transmitting fluid and an acid solution thereafter injected into the well. Hydraulic fracturing may also be aided by additional or extended fracturing due to explosive combinations brought directly into the newly formed fractures in accordance with the invention. The presence of either sodium or potassium metal inside of the plastic solid shapes, preferably fiber reinforced, serve both as an effective auxiliary fluid loss agent and when contacted by water, as a heat-generating means and as a source of explosive force which extends the fractures into the formation.

To illustrate the practice of the invention, the following examples were performed.

Example 1

A number of cylindrival concrete forms, twenty inches in diameter and thirty inches long were made and fractured according to the invention. One of such fractured forms is shown in elevation and partly in section in FIGURE 2.

Figure 2:
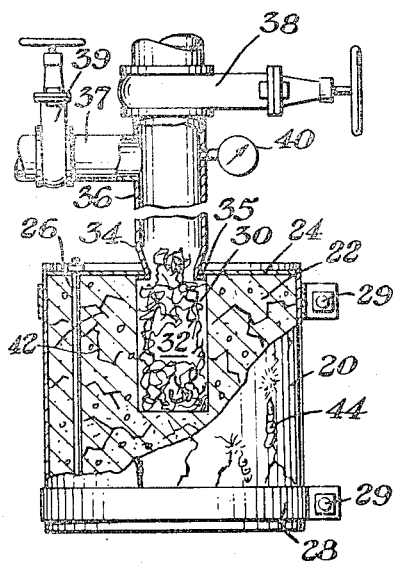
FIGURE 2 is an elevational view of a fractured cylindrical concrete form.

In FIGURE 2 is shown outer surface 20 of the concrete form and section 22 taken along a diameter thereof. Two reinforcing circular end plates 24, only one of which shows, are embedded near the ends of the forms. End plates 24 are bolted to each other by six thirty-inch long bolts, one of which is shown as item 26. Steel bands 28 encircle the form and are forced into tightly reinforcing contact with surface 20 by bolts 29. In one of end plates 24 is a central circular hole of less than four inches in diameter. Directly below the opening is four-inch cylindrical cavity 30 filled with the deformable solid fracturing composition 32 prepared and injected in accordance with the invention (the specific steps being described hereinbelow). Nipple 34, having a constriction therein and provided with a flange 35 is shown inserted in the central opening in plate 24 and held in place by the flange. Pipe 36 for feeding plastically deformable charges is secured to nipple 34. Pipe 37 provided with valve 39 for feeding pressure-transmitting fluid is shown connected to pipe 36. Valve 38 is shown in pipe 36. Pressure gauge 40 is shown in connection with pipe 36. Fractures 42, created in the concrete by fracturing, are shown radiating outwardly from cavity 30 and breaking the surface as cracks 44 filled with fracturing composition 32.

The concrete forms thus made were fractured according to the invention as follows: cyclindrical solid paraffin slugs of greater diameter than the constriction in nipple 34 were made in a mold. A soft grease suitable for use in a grease gun was forced into nipple 34. Then a mixture of excelsior and heated paraffin was placed in pipe 36 interposed at each foot with a preformed solid paraffin slug prepared as described. Additional grease was then forced into pipe 36 by means of air-pressured grease gun. At an average pressure of about 1000 p.s.i., the concrete forms fractured and cracked as typically shown in FIGURE 2. Some of the grease first placed in nipple 34 oozed out through the cracks followed very slowly by some of the paraffin and excelsior mixture. With additional pressure applied to the pressure-transmitting grease, the cracks in the concrete continued to widen as the excelsior-wax mixture was forced into them until the pressure rose to about 1500 p.s.i. when the concrete block became so fractured that the pressure dropped below an effective value. Very effective fracturing was attained by the practice of the invention.

To illustrate the removal of the paraffin-excelsior fracturing composition from the fractures thus produced when such removal might be desirable, some of the fracturing composition protruding through cracks 44 was ignited by a torch, a non-combustible cover placed over the form, and a line leading from an oxygen gas source, at a pressure of 1 p.s.i., directed into the vicinity of the ignited composition. The composition burned steadily giving off considerable heat which caused the concrete form to crack further and begin to fall apart. It is therefore clear that the fracturing composition employed according to the invention may be readily removed.

Example 2

Figure 3:
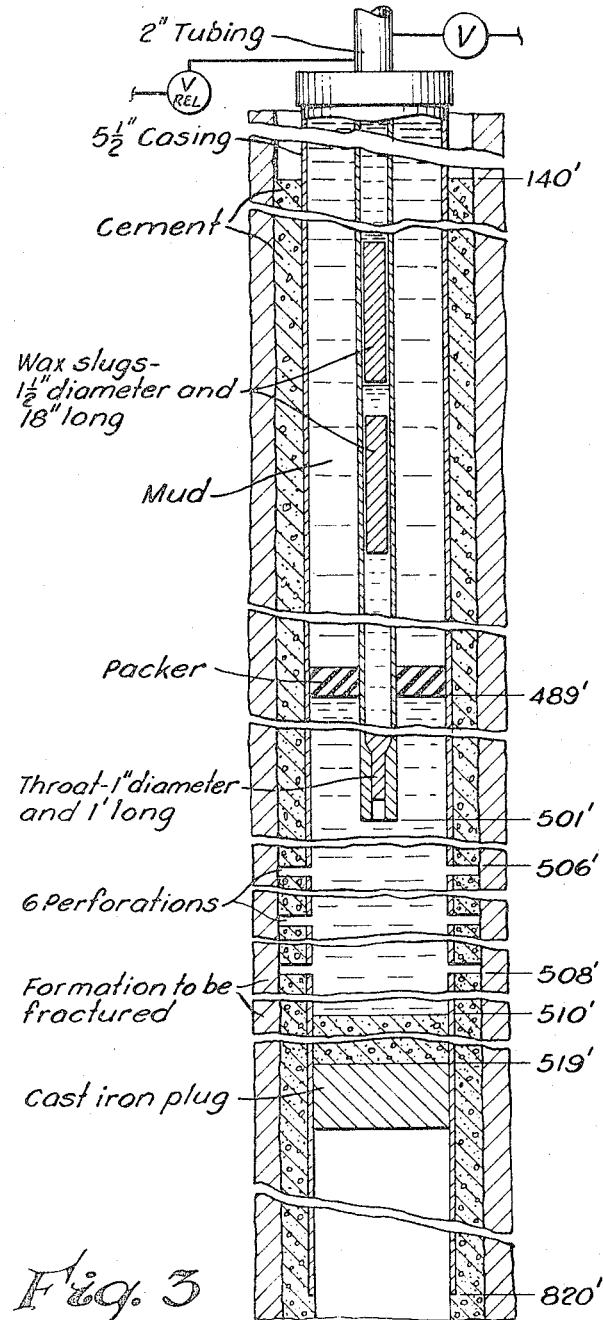
FIGURE 3 is an elevational diagrammatic view showing a stage of treatment.

Example 2 further illustrates the practice of the invention. These examples were performed on wells in active oil fields. FIGURE 3 is a diagrammatic elevation at the stage of treatment when the first deformable charge was being forced through the constricted nipple at the end of the tubing into the well.

The well was cased to a depth of 820 feet and plugged with a cast iron plug at a depth of 519 feet and 9 feet of cement placed on top of the plug. The casing was fixed in place by cementing to within 140 feet of ground level. The casing was perforated at a level of between 506 and 508 feet in a water zone, using three shots per foot giving a total of six perforations. A 2-inch tubing with a packer affixed to the lower end thereof, below which there was attached a 12-foot tailpipe, as shown, was run down the casing. When in position the packer was set at 489 feet which marked the extension of the tubing, the tailpipe, therefore, extending to 501 feet. The lower end of the tailpipe was fitted with a constricting nipple, as shown, which formed a throat which was 1 inch in diameter and 1 foot long.

Preliminary testing of the well showed that, at a pressure of 900 p.s.i., water could be pumped into the formation at a rate of 3 barrels per minute without appreciable diminution in the quantity taken into the formation, thereby showing a continual loss of fluid to the formation at that pressure.

Paraffin having a melting point of 130° F. was melted and mixed with 15 percent by weight of $BaSO_4$. The resulting admixture was cast into cylindrical sticks 1½ feet long and 1½ inches in diameter. The amount of $BaSO_4$ added, gave a specific gravity to the composition of more than 1. The volume of the sticks was such that 100 thereof would occupy a volume of 1.8 cubic feet or about 13.5 gallons. As a precaution against any tendency to soften, the sticks thus prepared were stored at 40° F. prior to use.

Conventional pumping equipment for fracturing a well was set up at the well site and adjusted to produce a maximum pressure of 8800 p.s.i. The tubing extended above the ground and was provided with a valved connection for introducing the sticks. 10 barrels of water were pumped into the formation. Additional water was then pumped into the annulus between the tubing and casing above the packer therein to provide insurance against the packer being unseated and the tubing being forced upwardly during treatment. The aforesaid valved connection in the tubing was opened and 4 sticks of the composition were fed into the tubing, which descended in the tubing, the lower one resting on the constricting nipple. Water was then injected at a pressure of 600 p.s.i., thereby urging the sticks through the throat while closing the throat against the passage therethrough of the water. The water was thus displaced upwardly at the constricted nipple.

Then 57 sticks of the deformable composition were passed down the tubing into the formation followed by more water and pressure applied, then 43 sticks of the composition, and again more water. The necessary pressure applied was 8800 p.s.i. and the well was bled back to reduce the pressure. Thereafter 100 sticks of composition were added, more water then 50 additional sticks followed by more water under pressure. The alternate introduction of water and sticks continued until a total of 350 sticks were injected into the well, during which the pressure peaks ranged between 4500 p.s.i. and 8800 p.s.i. Abrupt dropping off of the pressure occurred a number of times during injection indicating fracturing.

The well was shut in for a time and then opened after which water flowed out continually for about an hour. A few pieces of paraffin, the largest of which was about 2 inches x ¾ inch were flowed out. The total amount of paraffin that flowed out was less than the amount contained in two original sticks. The water leaving the well had a somewhat milky appearance due, as shown by subsequent analysis, to suspended broken bits of formation.

The rapid rise in pressure followed by abrupt drops in pressure during treatment is evidence that effective fracturing took place in the formation during treatment. The rate of water removal from the well by the same pumping equipment following the treatment was increased by 25 percent over that prior to treatment.

*Example 3*

Another treatment was performed in accordance with the invention on a non-producing well in the vicinity of Kellyville, Oklahoma. An open hole section was made by removing a section of casing. The well was treated as follows:

Elongated cylindrical slugs consisting of atomized aluminum metal cores encased in paraffin were molded. Tubing having a tapered nipple at the end thereof was placed in the well and a packer inserted in the annulus between the tubing and the wellbore wall.

The thus prepared paraffin-encased aluminum slugs were fed down the tubing. The remaining volume of the tubing was then filled with water as the pressure-transmitting fluid and pressure applied thereto which forced the slugs into the formation. Thereafter a 15 percent by weight aqueous solution of hydrochloric acid was injected down the well followed by a small amount of particulated uncased magnesium alloy having the A.S.T.M. designation, ZK60. The magnesium alloy reacted with the acid thereby initiating sufficient heat to melt some of the paraffin encasing the aluminum which thereupon reacted giving off much heat and melting all the paraffin. Both high temperature and a low fluid loss treating composition were thus provided by the treatment.

A number of advantages are to be realized from the practice of the various embodiments of the invention summarized below:

(1) Plastically deformable material which is a solid at the well site temperature, such as paraffin, pitch, tar, bitumen, asphalt, beeswax, and certain resins which are deformable at ambient well temperatures and which sufficiently soften at temperatures in subterranean formations may be molded into conveniently shaped charges and injected into a well by means of a pressure-transmitting fluid. When the solids have sufficiently greater density than the fluid, very little fluid will pass into the formation.

(2) The composition employed to form the charges may be reinforced with shredded cellulosic or fibrous material.

(3) Sodium or potassium may be encased in the paraffin, pitch, or other deformable material with or without fibrous reinforcement, and pumped into the well via an oily-vehicle, e.g., kerosene, to serve first as a plugging agent and secondly, as an explosive fracturing agent. By the practice of this embodiment, both heat and gas liberation are controlled.

(4) Harder metals, e.g., zinc, aluminum, and magnesium may be encased in the deformable solid, e.g., paraffin or pitch, and pumped into the well via an acidified vehicle with which the metal subsequently reacts to generate heat for rapid melting of the paraffin or pitch.

(5) One of two reactants of an explosive mixture may be encased in the deformable solid, e.g., paraffin or pitch, and another reactant contained in the liquid vehicle of a treating agent. The reactant later coming into contact in the formation will result in explosions. An explosive, e.g., ammonium nitrate, can be made the core of a slug having an outer layer of a deformable solid, e.g., paraffin, can, by the practice of the invention, be employed in a formation and the explosive thereafter detonated. Present methods of emplacing explosives by injection, e.g., in a slurry, result in loss of control of the placement of the explosive. As a result, subsequent detonation is often made impossible, or if attained, is ineffective because of its improper location.

(6) Sand or other propping agents may be molded with the deformable material into the charges, or the propping agent may be encased in a sheath of the deformable substance and thus injected into the fractures produced during fracturing in accordance with the invention.

Both the deformable substance and the reinforcing fibrous material when employed, are readily obtainable. Among the more readily obtainable fibrous materials, are animal hair, vegetable fibers, mineral fibers, fine wire, synthetic yarn, and shredded leather, cellulose, wood pulp, excelsior, wood shavings, straw, polymerized macromolecules, and hulls and shells of nuts, weed pods and the like.

Having described the invention, what is claimed and desired to be protected by Letters Patent is:

1. The method of producing a reactive material in situ in a formation traversed by a well consisting of inserting a tubing having a constricted outlet at the lower end thereof down the well, molding two types of charges of plastically deformable combustible material of less cross-section than said tubing but of greater cross-section than said outlet, one of said types having incorporated therein a first reactive substance and the second of said types having incorporated therein a second reactive substance explosively reactive with the first reactive substance and forcing the first type of charge thus molded, via a pressure-transmitting fluid, downwardly through said constricted outlet and thence outwardly into said formation and then forcing the second type charge thus molded, via the pressure-transmitting fluid, through said constricted outlet and thence into said formation where at least a portion of each of said reactive substances comes into contact with the other to effect an explosive reaction therebetween.

2. The method of claim 1 wherein the explosive reaction between said reactants yields a product which is reactive with a material present in the formation.

3. The method of claim 2 wherein said first reactive substance is an oxygen gas source selected from the class consisting of chlorates and nitrates decomposable by heat and said second reactive substance is a chlorinated hydrocarbon selected from the class consisting of hexachloroethane and hexachlorobenzene, said deformable combustible material is paraffin and said formation is predominantly limestone.

4. The method of treating a subterranean formation traversed by a well consisting of inserting down the well a tubing, to a less depth than that of the well, having a constricted outlet at the lower end thereof which is of less diameter than the tubing; intermixing a plastically deformable substance and forming the resulting intermixture into charges of less cross-section than that of the tubing but of greater cross-section than that of said constricted outlet; injecting the charges thus made down the tubing so that a charge lodges in, and substantially inhibits the passage of fluids through said constricted outlet; introducing a pressure-transmitting fluid into the tubing in sufficient amount to maintain the tubing full; applying sufficient pressure on said fluid, and continuing to inject additional charges down the tubing to force charges successively out through said constricted outlet, and thence into said formation.

5. The method according to claim 4 wherein said fluid is a liquid.

6. The method according to claim 4 wherein the pressure applied to said pressure-transmitting fluid is sufficiently great to form a plastic mass and continuing to increase the pressure on said fluid to force the plastic mass against exposed faces of the formation to effect fractures therein.

7. The method according to claim 4 wherein said plastically deformable charges are composed of a substance selected from the class consisting of paraffin, tar, pitch, bitumen, asphalt, and natural waxes and resins which are moldable and deformable at the temperature of the treatment.

8. The method according to claim 4 wherein said plastically deformable substance has intermixed therewith fibrous reinforcing material.

9. The method according to claim 4 wherein said fibrous reinforcing material is combustible.

10. The method according to claim 9 wherein the mass of plastically deformable substance and fibrous material is subsequently ignited by introducing an ignition means and oxygen whereby substantial portions of the mass are removed by burning.

11. The method of treating a subterranean oil-bearing formation traversed by a well consisting of inserting down the well a tubing, to a less depth than that of the well, said tubing having a constricted outlet at the lower end thereof of less diameter than the tubing; forming charges of less cross-section than said tubing but of greater cross-section than said outlet, said charges consisting of a core which is chemically reactive with a second reactant, is of a material selected from the class consisting of metals and metal alloys, carbon, and solid hydrocarbons, and is encased in an oil-soluble plastically deformable material; and continuously injecting the core-containing charges thus formed and a sufficient amount of a pressure-transmitting fluid to fill said tubing; applying pressure on said fluid sufficient to force the charges down the tubing, each successively lodging in the constricted outlet to inhibit substantially the passage of fluid through said outlet and continuing to apply pressure on said fluid to force said charges successively through the outlet, and thence into the formation; continuing to apply pressure to force said charges into the formation until they are converted into a plastic mass, whereby the oil-soluble encasing plastically deformable material is brought into contact with oil and substantial portions thereof are dissolved.

12. The method of treating a subterranean formation containing fluid hydrocarbons and fluidizable hydrocarbons having a pipe extending thereinto, the pipe having a constricted outlet at the lower end thereof, consisting essentially of forming charges of less cross-section than said pipe to permit a flow of a fluid between the inner wall of the pipe and circumferential surface of the charges but of greater cross-section than said constricted outlet, said charges consisting of a core of a first explosive reactant material, which is chemically reactive with a second reactant, encased in a plastically deformable oil-soluble sheath which is inert to said first explosive reactant; injecting the charges so made down the pipe until a charge is lodged in said constricted outlet to inhibit substantially the passage of fluid therethrough; introducing a pressure-transmitting fluid into the pipe containing the charges until it is filled; applying pressure to the fluid and maintaining the pipe filled with the fluid to force, successively, the charges out the constricted outlet into the formation; continuing to inject charges in closely spaced-apart order into the pipe and to introduce fluid to maintain the pipe full to convert the charges thus forced out the outlet, into a flowable mass in the formation; and contacting the mass with said second reactant.

13. The method according to claim 12 wherein the core is an alkali metal and said second reactant is water.

14. The method according to claim 12 wherein the core is selected from the class consisting of the alkaline earth metals, aluminum, zinc, manganese, chromium, and iron and the second reactant is a mineral acid.

15. The method according to claim 12 wherein the formation comprises limestone, the core is carbon, and said second reactant is CaO produced in situ by introducing heat into the formation, and the ensuing reaction between the core and the CaO yielding $CaC_2$.

16. The method according to claim 15 wherein water is brought into contact with the $CaC_2$ thus formed to yield acetylene gas in situ.

References Cited in the file of this patent

UNITED STATES PATENTS

| | | |
|---|---|---|
| 2,481,422 | Haynes et al. | Sept. 6, 1949 |
| 2,672,201 | Lorenz | Mar. 16, 1954 |
| 2,705,920 | Kanady | Apr. 12, 1955 |
| 2,790,500 | Jones | Apr. 30, 1957 |
| 2,823,753 | Henderson et al. | Feb. 18, 1958 |
| 2,872,982 | Wade | Feb. 10, 1959 |
| 2,879,847 | Irwin | Mar. 31, 1959 |
| 2,880,802 | Carpenter | Apr. 7, 1959 |
| 2,943,681 | Barrett | July 5, 1960 |
| 2,961,045 | Stogner et al. | Nov. 22, 1960 |